United States Patent [19]
Floyd et al.

[11] Patent Number: 6,014,240
[45] Date of Patent: Jan. 11, 2000

[54] METHOD AND APPARATUS FOR AN INTEGRATED LASER BEAM SCANNER USING A CARRIER SUBSTRATE

[75] Inventors: Philip D. Floyd; Decai Sun, both of Sunnyvale, Calif.; Joel A. Kubby, Rochester, N.Y.

[73] Assignee: Xerox Corporation, Stamford, Conn.

[21] Appl. No.: 09/203,442

[22] Filed: Dec. 1, 1998

[51] Int. Cl.$^7$ ........................................... G02B 26/08
[52] U.S. Cl. ........................... 359/201; 359/850; 359/224
[58] Field of Search ...................... 359/198, 201, 359/202, 212, 213, 214, 220, 221, 223, 224, 225, 850; 250/230, 234

[56] References Cited

U.S. PATENT DOCUMENTS 5,629,790  5/1997  Neukermans et al. .................. 359/198

OTHER PUBLICATIONS

Daneman, M.J.; Solgaard, O.; Tien, N.C.; Lau, K.Y.; Muller, R.S. "Laser–to–Fiber Coupling Module using a Micromachined Alignment Mirror." *IEEE Photonics Technology Letters,* vol. 8, No. 3, Mar. 1996, pp. 396–398.

Judy, J.W.; Muller, R.S. "Batch–Fabricated, Addressable, Magnetically Actuated Microstructures." *Solid–State Sensor and Actuator Workshop,* Hilton Head, South Carolina, Jun. 2–6, 1996, pp. 187–190.

Lin, L.Y.: Lee, S.S.; Pister, K.S.J.; Wu, M.C. "Self–aligned hybrid integration of semiconductor lasers with micromachined micro–optics for optoelectronic packaging." *Appl. Phys. Lett. 66* (22), May 29, 1995, ©1995 American Institute of Physics, pp. 2946–2948.

*Primary Examiner*—Cassandra Spyrou
*Assistant Examiner*—Leo Boutsikaris

[57] ABSTRACT

An solid state scanning system having a single crystal silicon deflection mirror and scanning mirror is integrated with a light source. Separation of the micro-electromechanical systems and light emitters on separate substrates allows the use of flip-chip and solder bump bonding techniques for mounting of the light sources. The separate substrates are subsequently full wafer bonded together to create an integrated solid state scanning system.

20 Claims, 12 Drawing Sheets

METHOD AND APPARATUS FOR AN INTEGRATED LASER BEAM SCANNER USING A CARRIER SUBSTRATE

CROSS-REFERENCE TO RELATED APPLICATIONS

The present invention is related to "METHOD AND APPARATUS FOR AN INTEGRATED LASER BEAM SCANNER" by Floyd, Sun and Kubby (Attorney Docket No. D/98706), Ser. No.09/201738, filed on the same day and assigned to the same assignee which is hereby incorporated by reference in its entirety.

BACKGROUND AND SUMMARY OF INVENTION

The present invention relates generally to the field of laser beam scanning systems, and more particularly to micro-electro-mechanical systems (MEMS) for laser beam scanning. Miniature laser beam scanning systems are important for applications such as barcode scanning, machine vision and, most importantly, xerographic printing. The use of MEMS to replace standard raster output scanning (ROS) in xerographic print engines allows simplification of printing systems by eliminating macroscopic mechanical components and replacing them with large arrays of scanning elements. Advanced computation and control algorithms are used in managing the large arrays of scanning elements. Such MEMS based printing systems are entirely solid state, reducing complexity, and allowing increased functionality, including compensation of errors or failures in the scanner elements.

An important step in constructing solid state scanning systems is integration of the semiconductor light emitter directly with MEMS actuators to gain the desired optical system simplification. Integrated scanners, which have lasers and scanning mirrors in the same structure, have been demonstrated using manual placement of laser chips onto MEMS wafers with micromachined alignment parts and adhesives by L. Y. Lin et al in Applied Physics Letters, 66, p. 2946, 1995 and by M. J. Daneman et al in Photonics Technology Letters, 8(3), p. 396, 1996. However, current techniques do not allow for wafer-scale integration of the light-emitter and MEMS device.

In accordance with the present invention a laser beam scanner consisting of a single crystal silicon deflection mirror and a torsional mirror is integrated with a laser diode in the same structure. Details of creating a torsional mirror and actuating it magnetically or electrostatically are detailed in U.S. Pat. No. 5,629,790 by Neukermans and Slater which is incorporated herein by reference in its entirety.

Using solder bump bonding methods, completed and tested laser diodes are bonded to a glass or a silicon carrier substrate. The carrier substrate is aligned and bonded to a Si or SOI wafer containing the MEMS layers. Bonding of the lasers to a carrier substrate completely partitions the bonding process from the MEMS. This complete partition eliminates possible conflicts between the conditions needed for solder bump bonding, such as the use of solder flux, and preserves the integrity of the MEMS layers.

The substrates are heated in a non-oxidizing environment to join the two substrates. High surface tension of the solder aligns the wettable metal bonding pads on each substrate with each other. The ability of the reflowed solder to self-align the substrates because of surface tension simplifies assembly.

The use of the SCS layer of a SOI wafer, rather than a polysilicon film provides for the introduction of very flat and smooth mirrors and high reliability torsion bars. The device is scalable to arrays of lasers and scanning mirrors.

Integration of the scanner and light source eliminates the need for external, manual alignment of light sources and scanning mirrors. Simplified post-processing steps such as interconnect metallization can be realized because the use of an etched recess results in nearly planar surfaces. In addition, pick and place technologies used for multi-chip module assembly can be adapted for wafer scale assembly and bonding of light sources to the carrier substrate.

Thus, the present invention allows the integration of lasers, electrical interconnects, and electrodes on a single glass or Si wafer for actuation of MEMS devices. The glass or Si wafer is aligned and bonded to the MEMS wafer, forming an integrated, three dimensional structure.

BRIEF DESCRIPTION OF THE DRAWINGS

A more complete appreciation of the invention and many of the attendant advantages thereof will be readily obtained and understood by referring to the following detailed description and the accompanying drawings in which like reference numerals denote like elements as between the various drawings. The drawings, briefly described below, are not to scale.

DETAILED DESCRIPTION

Figure 1:
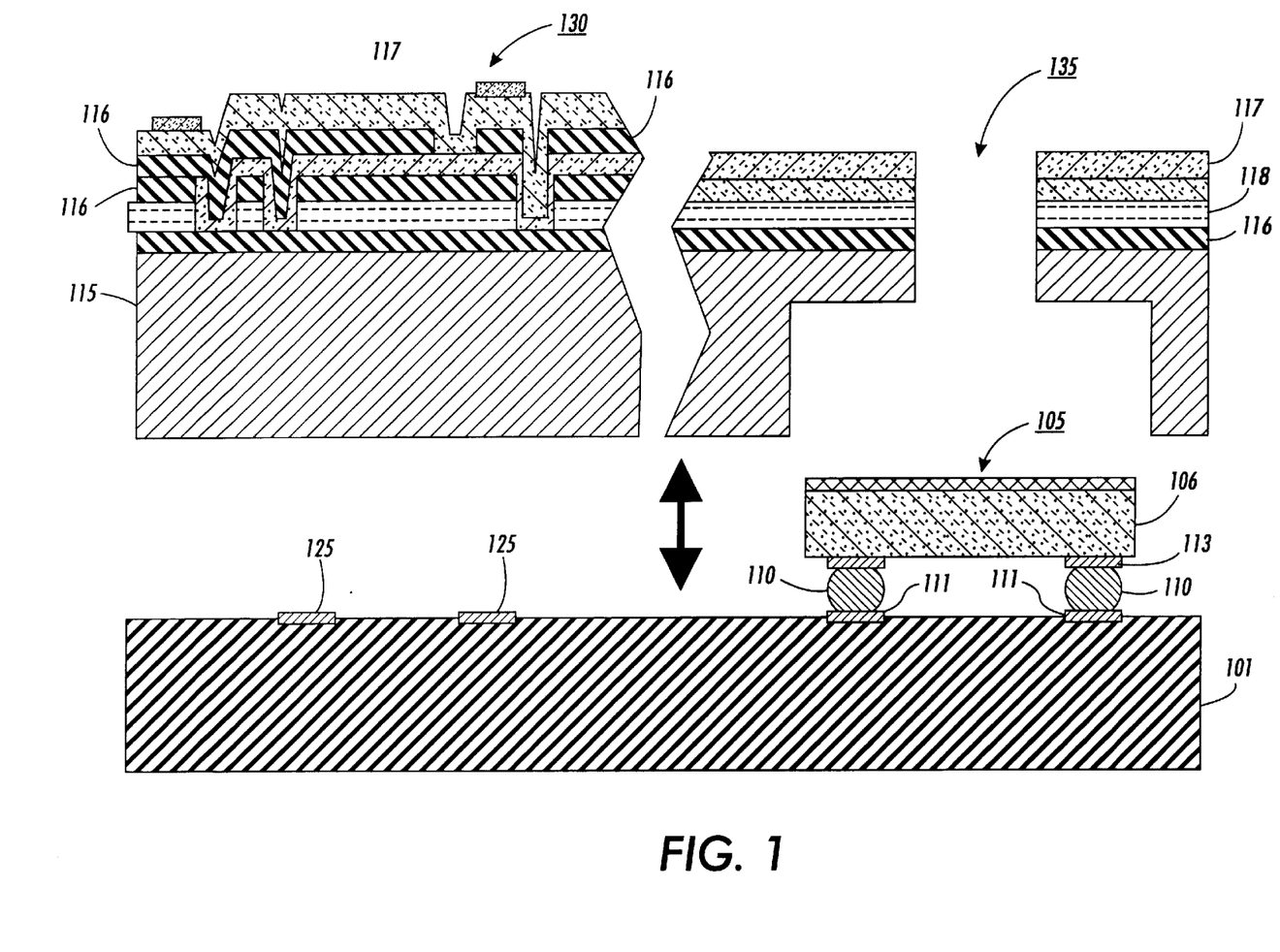
FIG. 1 is shows MEMS layers and VCSEL for a laser beam scanner in accordance with an embodiment of this invention.
Figure 2A:
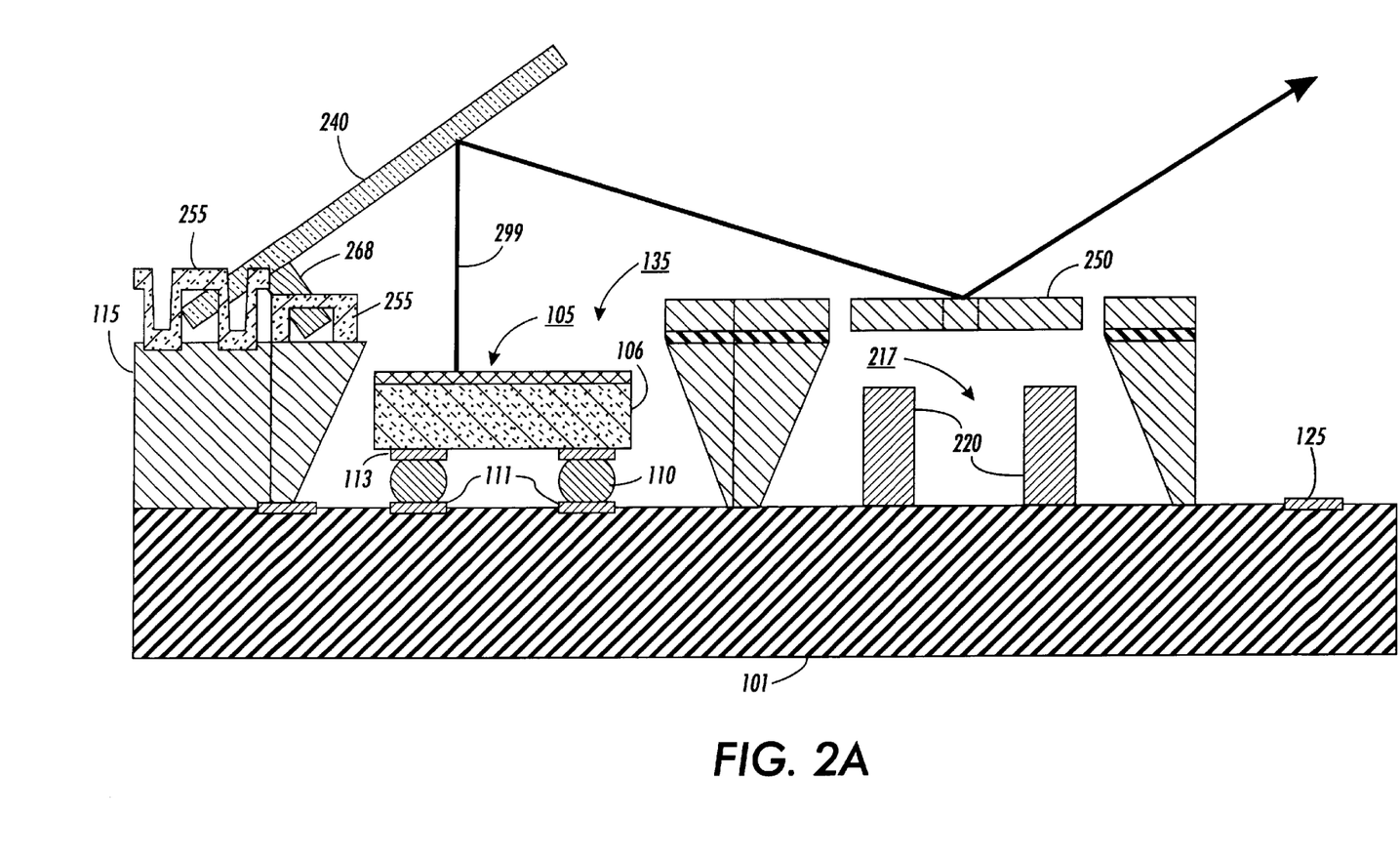
FIG. 2a shows a laser beam scanner with optical path having an electrostatically actuated torsion mirror in accordance with an embodiment of this invention.

An embodiment in accordance with the present invention is shown in FIG. 1 and FIG. 2a. A laser beam scanner consisting of single crystal silicon (SCS) deflecting mirror 240 and torsional mirror 250 is integrated with laser diode or light emitting diode 105. Using solder bump bonding methods, completed and tested laser diodes 105 are bonded to glass or silicon carrier substrate 101. Carrier substrate 101 is aligned and bonded to MEMS substrate 130 containing the MEMS layers. Bonding of laser diode 105 to carrier substrate 101 completely partitions the bonding process from the MEMS layers. This complete partition eliminates possible conflicts between the conditions needed for solder bump bonding, such as the use of solder flux, and preserves the integrity of the MEMS layers. Typically, solders such as Pb/Sn, Au/Sn, or In/Sn are evaporated selectively onto wettable metal bonding pads 111 onto substrate 101 and reflowed to form hemispherical solder bumps 110. Solder bumps 110 are contacted to wettable metal bonding pads 113 on laser substrate 106.

Laser substrate 106 and carrier substrate 101 are heated in a non-oxidizing environment to join the respective substrates together. High surface tension of the solder aligns wettable metal bonding pads 11 1 with wettable metal bonding pads 113 on laser substrate 106. The ability of the reflowed solder to self-align laser substrate 106 with carrier substrate 101 because of surface tension simplifies the assembly process. Additionally, very little pressure is required during the process of bonding laser substrate 106 to carrier substrate 101.

Micromechanical elements (MEMS) are formed on MEMS substrate 130, typically about 500 $\mu$m thick using conventional photolithography and the patterning of single crystal silicon (SCS) layer 118, polysilicon layers 117 and insulating oxide layers 116, which are typically PSG or thermal oxide, is performed using both dry and wet etching techniques. MEMS substrate 130 embodies SCS layer 118, insulating oxide layer 116 and silicon substrate 115. Typical thickness for each of layers 116, 117, and 118 is on the order of several $\mu$m. VCSEL (vertical cavity surface emitting laser) 105 is solder bump 110 bonded to glass or dielectric-coated (typically $SiO_2$ or $Si_3N_4$ coated) Si substrate 101, typically about 500 $\mu$m thick. Additionally, two actuation electrodes 220 and two interconnects 125 are formed on glass or dielectric-coated Si substrate 101. Interconnects 125 provide current to substrate 101 to power VCSEL 105 and to electrodes 220 for control of torsional mirror 250. After solder bonding of VCSEL 105 to glass or dielectric-coated Si substrate 101, substrate 101 is aligned and bonded to MEMS substrate 130.

MEMS substrate 130 has deep reactive ion etching (RIE) and/or wet etched hole 135, typically 3 mm in diameter, for emitted light 299 (see FIG. 2a) to pass through MEMS substrate 130 and onto deflecting mirror 240. Deflecting mirror 240 reflects emitted light 299 onto torsional mirror 250. As shown in FIG. 2a, polysilicon hinge 255 attaches deflecting mirror 240 to MEMS substrate 130. Deflecting mirror 240 is etched from SCS layer 118. Polysilicon hinge 255 allows deflecting mirror 240 to rotate clockwise about an axis perpendicular to the plane of FIG. 2a, out of MEMS substrate 130 to the position above via 135 as shown in FIG. 2a. Deflecting mirror 240 is supported by support latch 268 controlled by a spring and latch assembly (not shown) in the manner described in the paper by Lin et al. in Photonics Technology Letters, 6(12), p. 1445, 1994 which is incorporated herein in its entirety by reference. Controlling the position and length of support latch 268 allows the angle of deflecting mirror 240 to be precisely fixed. Deflection of torsional mirror 250 in both directions is accomplished by charging alternately one of two actuator electrodes 220. Torsional mirror 250 is electrically grounded and attracted to charged one of two actuator electrodes 220.

Figure 2B:
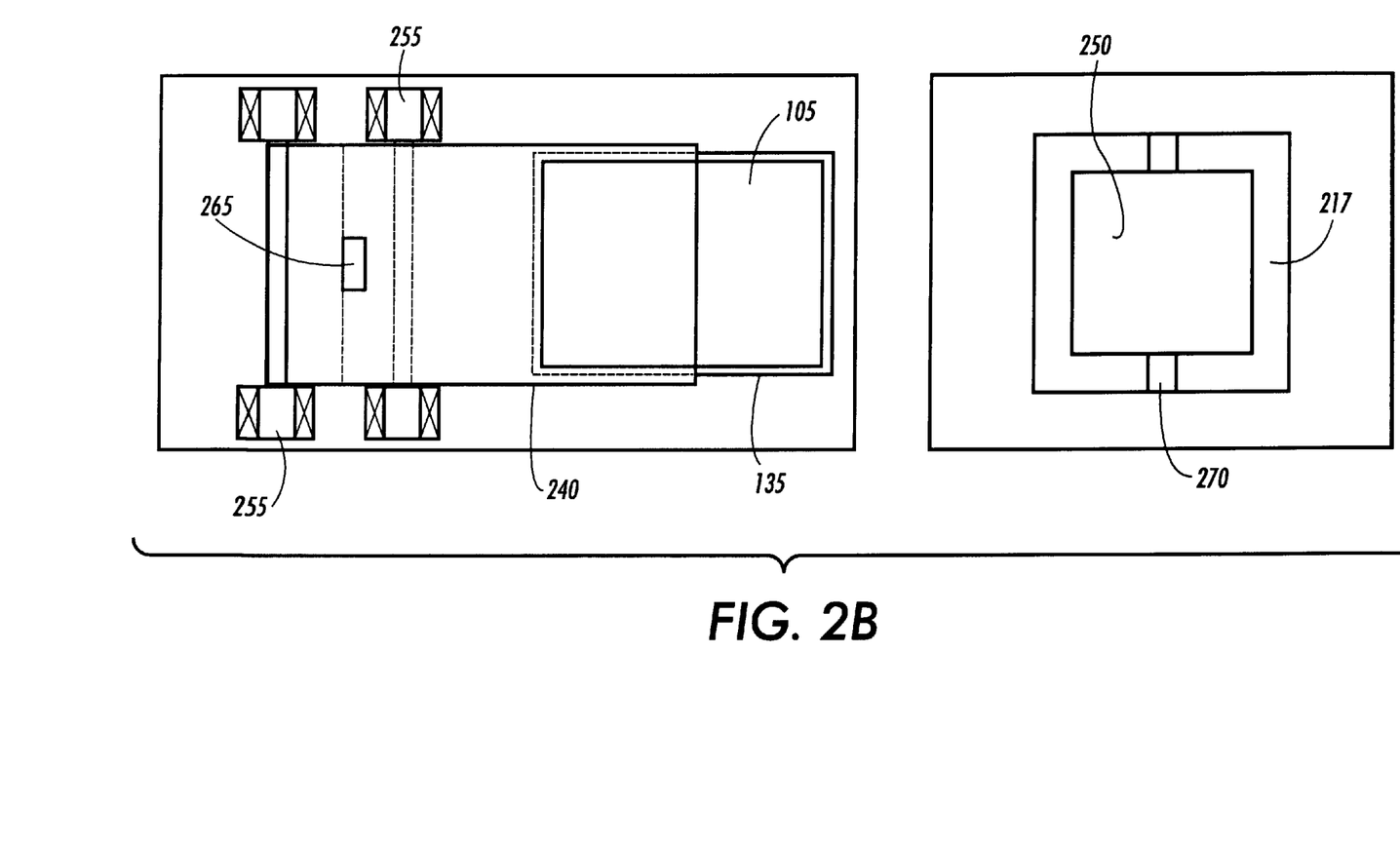
FIG. 2b shows a top view a laser beam scanner in accordance with an embodiment of this invention.

FIG. 2b shows a top view of one combination deflection mirror/torsional mirror solid state element. Polysilicon hinges 255 and deflecting mirror 240 are shown along with hole 265 to receive the tab (not shown) on support latch 268. The layout of torsional mirror 250 supported by torsion bar 270 with respect to hole 217 is also shown.

MEMS components such as deflecting mirror 240 and torsional mirror 250 can be formed in MEMS substrate 130 by using a combination of well-known surface and bulk micro-machining techniques. Polysilicon hinges 255 may be formed as described by M. C. Wu, "Micromachining for Optical and Optoelectronic Systems," Proceedings of IEEE, Vol. 85, p. 1833, 1997 and by Pister et al., "Microfabricated Hinges," Sensors and Actuators, A: Physical v. 33 n. 3 pp. 249–256, June 1992 which are hereby incorporated by reference in their entirety.

As seen in FIG. 1, bonding of VCSEL 105 to glass or $SiO_2$ coated Si substrate 101 completely separates the bonding process from the MEMS components. The separation eliminates possible conflicts between conditions needed for solder bump bonding, such as the use of solder flux and the integrity of the MEMS layers. Full wafer bonding of glass or dielectric-coated Si substrate 101 to MEMS substrate 130 is done at low temperature to avoid damage to VCSEL 105. Metallization on glass or dielectric-coated Si substrate 101 is achieved by use of adhesive bonding techniques requiring temperatures of between 20° C.–100° C.

Figure 3A:
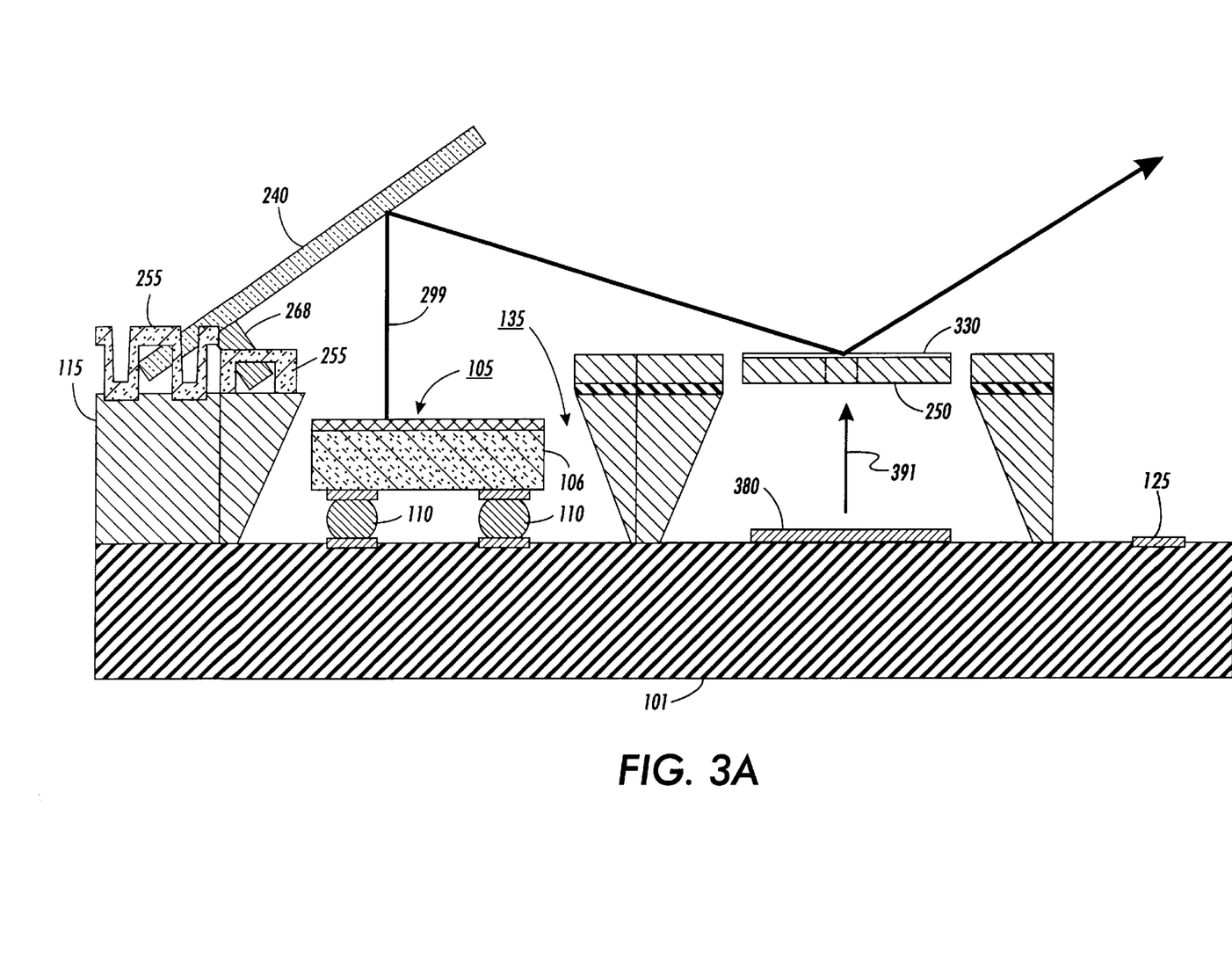
FIG. 3a shows a laser beam scanner with optical path having a magnetically actuated torsion mirror in accordance with an embodiment of this invention.

Another embodiment in accordance with the present invention is shown in FIG. 3A. VCSEL (vertical cavity surface emitting laser) 105 is solder bump 110 bonded to glass or dielectric-coated Si substrate 101. Glass or dielectric-coated Si substrate 101 is aligned and bonded to MEMS substrate 130. MEMS substrate 130 has deep RIE and/or wet etched via 135 for emitted light 199 to pass through the surface of MEMS substrate 130 and onto deflecting mirror 240 which reflects emitted light 299 onto torsional mirror 250. Torsional mirror 250 contains ferromagnetic thin film 330 with magnetization in the plane of torsional mirror 250. Coil 380 on glass or dielectric-coated Si substrate 101 generates magnetic field 391 perpendicular to the magnetic field created by ferromagnetic thin film 330 contained on torsional mirror 250. Hence, actuation of coil 380 turns torsional mirror 250. Polysilicon hinge 255 attaches deflecting mirror 240 to MEMS substrate 130. Polysilicon hinge 255 allows deflecting mirror 240 to rotate clockwise about an axis perpendicular to the plane of FIG. 3a, out of MEMS substrate 130 to a position above via 135 as shown in FIG. 3a. Deflecting mirror 240 can be supported by support latch 268 controlled by a spring and latch assembly (not shown) in the manner shown by Lin et al. in Photonics Technology Letters, 6(12), p. 1445, 1994 and incorporated herein in its entirety by reference. Fixing the position and length of support latch 268 allows the angle of deflecting mirror 240 to be precisely fixed.

Figure 3B:
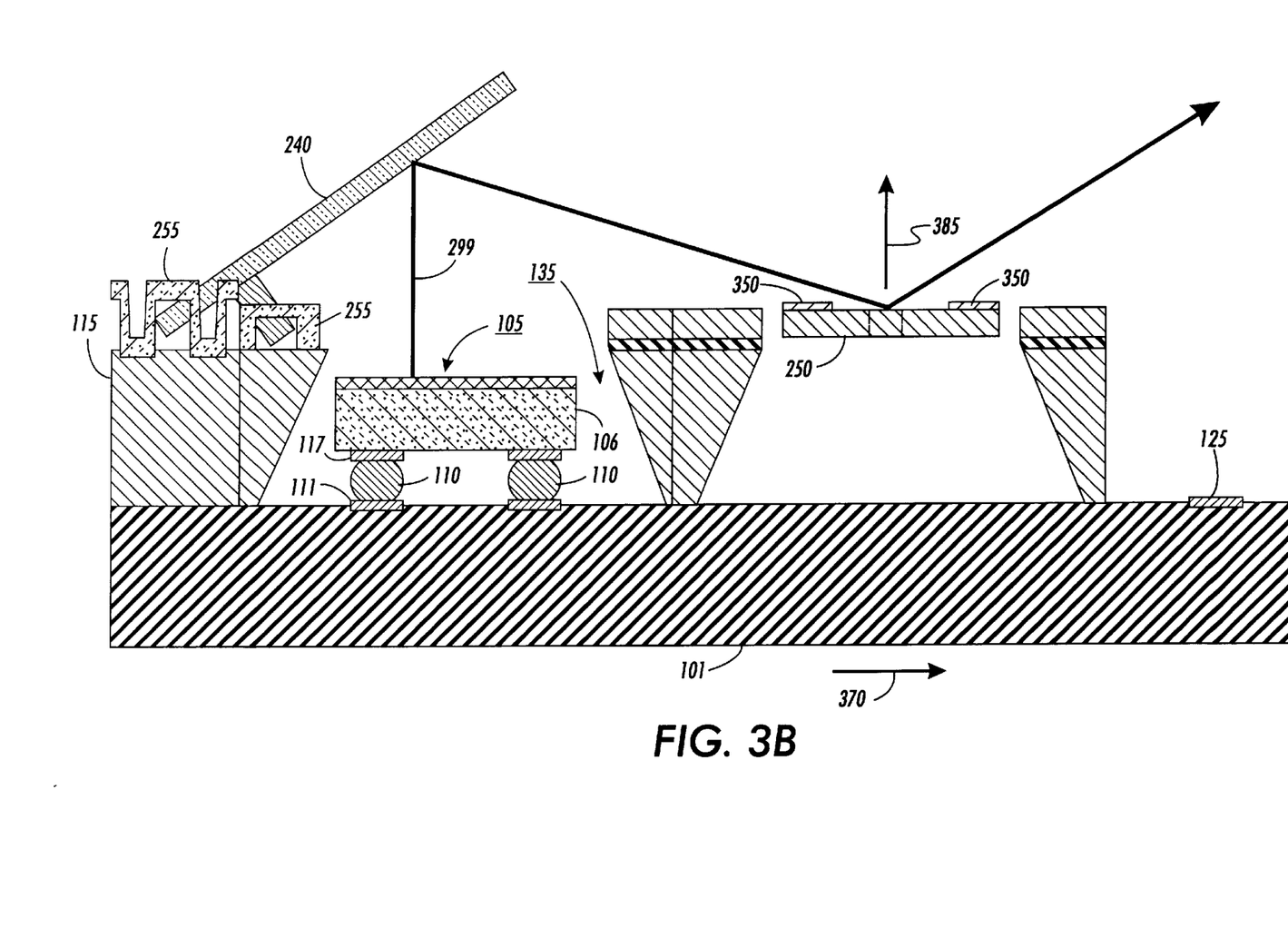
FIG. 3b shows a laser beam scanner with optical path having a magnetically actuated torsion mirror using an external magnetic field in accordance with an embodiment of this invention.

FIG. 3b shows an embodiment in accordance with this invention wherein torsional mirror 250 contains microfabricated coil 350 generating magnetic field 385 perpendicular to torsional mirror 250 but is otherwise similar to FIG. 3a. Coil 350 is a conductive loop which may be formed by vapor depositing conductive material onto torsional mirror 250 and patterning into coil 350. External magnetic field 370 is applied parallel to the plane of torsional mirror 250 to turn torsional mirror 250. Application of current to coil 350 results in an angular deflection of torsional mirror 250 proportional to the current introduced into coil 350. Hence, coil 350 behaves like a galvanometer coil. Direction of current flow in coil 350 determines the direction of the angular deflection of torsional mirror 250.

Steps for fabricating deflecting mirror, supporting latch and VCSEL in accordance with this invention are shown in FIGS. 4a–4j and FIGS. 5a–5e. The starting material is MEMS substrate 130 which comprises a silicon on insulator material (SOI). MEMS substrate 130 includes silicon substrate 115, thermally-grown $SiO_2$ layer 116 bonded to wafer 113. MEMS substrate 130 is then thinned to the required thickness. MEMS substrates 130 are commercially available from, for example, Bondtronix, Inc. of Alamo, Calif. or Ibis Technology Corporation of Danvers, Mass. Typical thickness of SCS layer 118 is 2–20 μm depending on the required stiffness of the torsional spring elements and mirror surfaces to be constructed. Other MEMS layers are deposited on top of MEMS substrate 130 by well-known methods such as low pressure chemical vapor deposition (LPCVD). These MEMS layers include mechanical layers of polycrystalline silicon (polysilicon) 117 (not shown in FIGS. 4) and sacrificial oxide layer 119 that is phosphorus-doped glass (PSG). The embodiment in FIG. 4a has PSG layer 119 deposited directly on top of SCS layer 114. Polysilicon layer 117 (see FIG. 1) is subsequently deposited on PSG layer 119. Typical thicknesses for polysilicon layer 117 and PSG layer 119 are 1–2 μm.

Formation of MEMS elements occurs by conventional photolithography and patterning of SCS layer 114, polysilicon layer 117, and PSG layer 119 is performed using both wet and dry etching. In accordance with an embodiment of this invention, deflecting mirror 240 and deep recess 135 are required.

FIGS. 4a–4j show steps for fabricating deflecting mirror 240, torsional mirror 250, supporting latch 268, and deep recesses 135 and 217. Latch 268 has a tab (not shown) which inserts into corresponding hole 165 in the bottom of deflecting mirror 240. The final configuration of deflecting mirror 240 and latch 255 are shown in FIG. 6b. Typical sizes for deflecting mirror 240 are between 0.5 mm² to 1 mm².

Figure 4A:
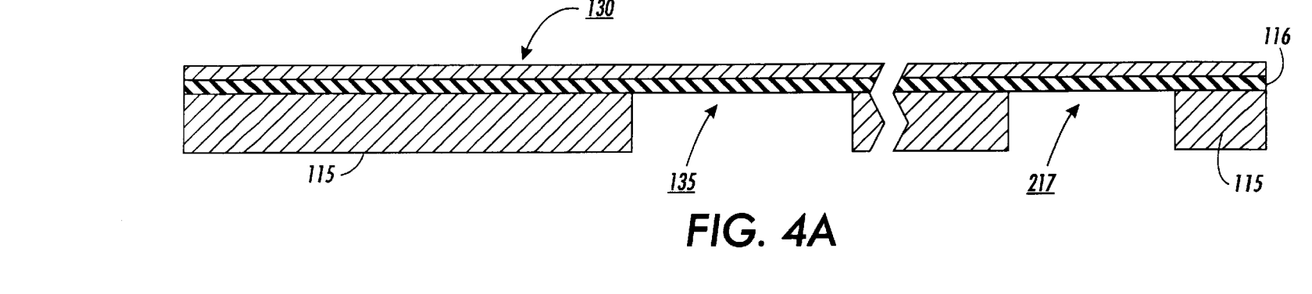
FIGS. 4a–4j show process steps for fabricating MEMS components in accordance with an embodiment of this invention.

FIG. 4a has silicon nitride ($SiN_x$) deposited on substrate 130 using LPCVD. $SiN_x$ layer (not shown) is patterned using $CF_4/O_2$ RIE with a photoresist mask. Potassium hydroxide (KOH) is used to etch holes from the bottom of substrate 115, stopping on layer 116. Size of hole 217 is similar to torsional mirror 250 to allow free rotation. Hole 135 is simultaneously etched, for fitting VCSEL 105 which typically has dimensions of 500 μm by 500 μm. Alternatively, holes 217 and 135 may be defined by deep RIE using $C_4F_8$ and $SF_6$ with a mask of $SiN_x$ or photoresist.

Figure 4B:
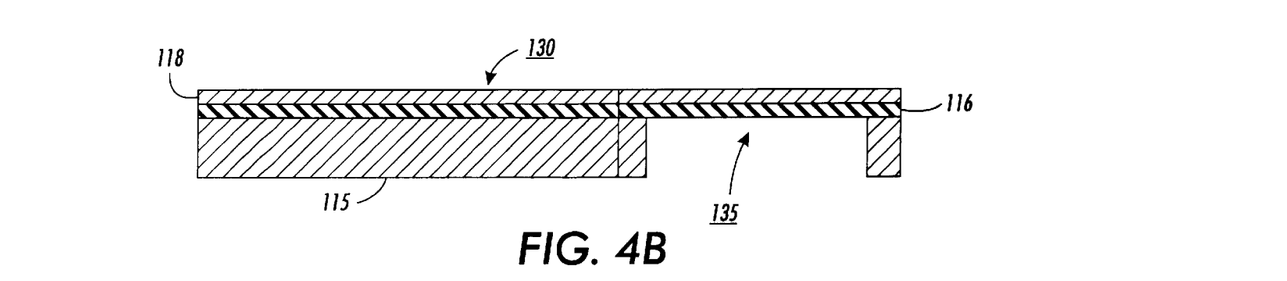

FIG. 4b shows recess 135 (200–250 μm deep) etched into MEMS substrate 130 using a combination of $CF_4/O_2$ RIE for etching SCS layer 114 and insulator layer 116 and a deep RIE of recess 135 using $C_4F_8$ and $SF_6$.

Figure 4C:
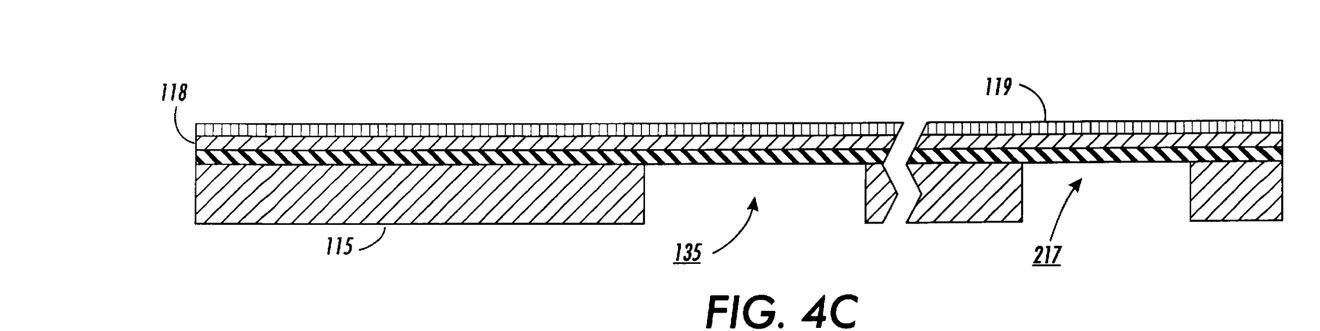

FIG. 4c shows CVD deposition of PSG layer 119.

Figure 4D:
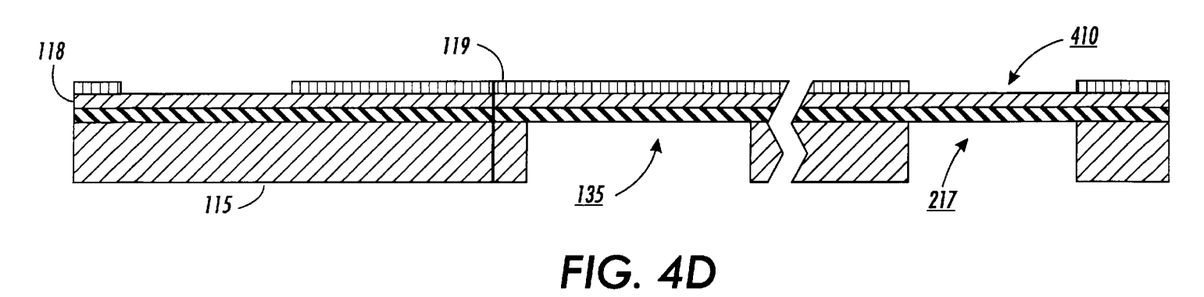

FIG. 4d shows the wet etch of windows 410 into PSG layer 119 down to SCS layer 114.

Figure 4E:
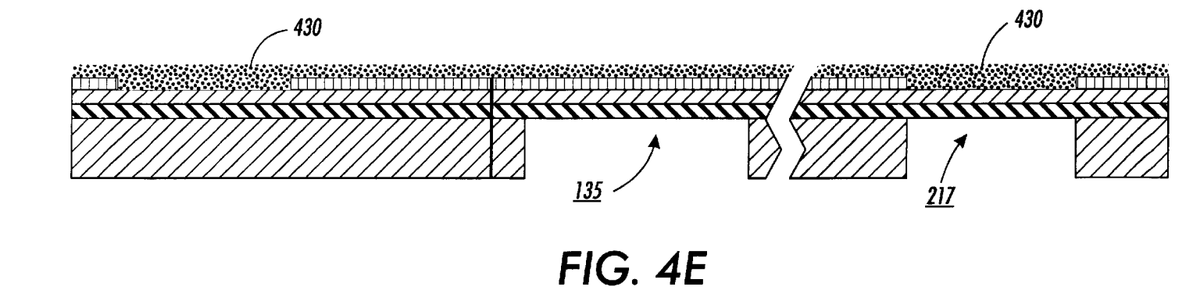

FIG. 4e shows deposition of aluminum film 430 (typically 0.1–0.2 μm thick) as a high reflectivity layer.

Figure 4F:
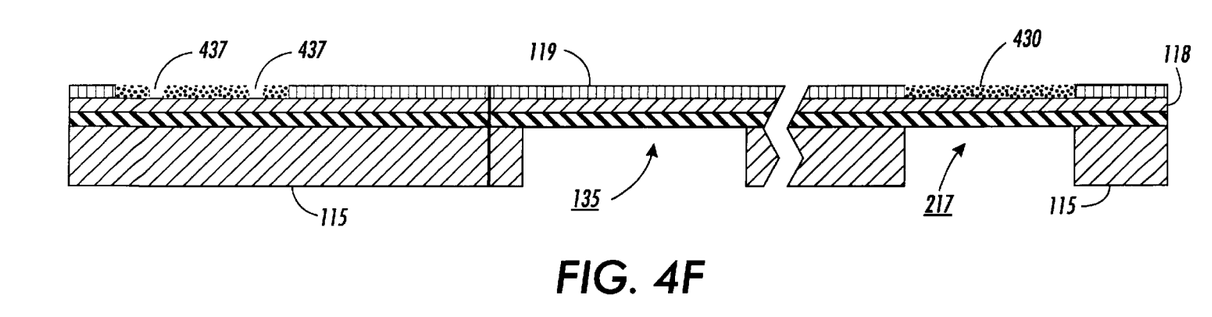

FIG. 4f shows a wet etch (typically a mixture of phosphoric and nitric acid) of aluminum film 430 to remove aluminum in all but the mirror regions. The mirror region locations coincide with the locations of windows 410.

Figure 4G:
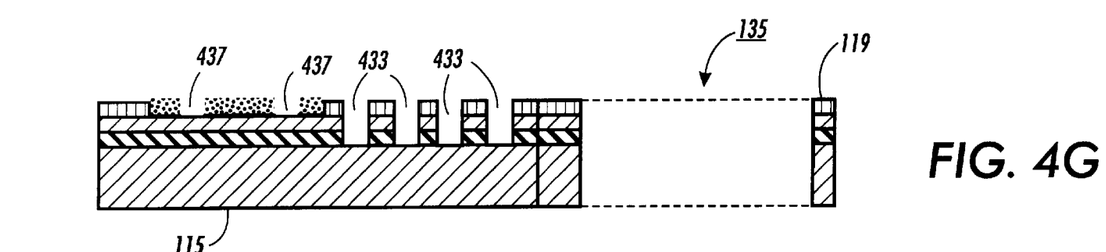

FIG. 4g shows the etch of vias 433 using $CF_4/O_2$ RIE with a photoresist mask. This step also serves to open laser die window 135.

Figure 4H:
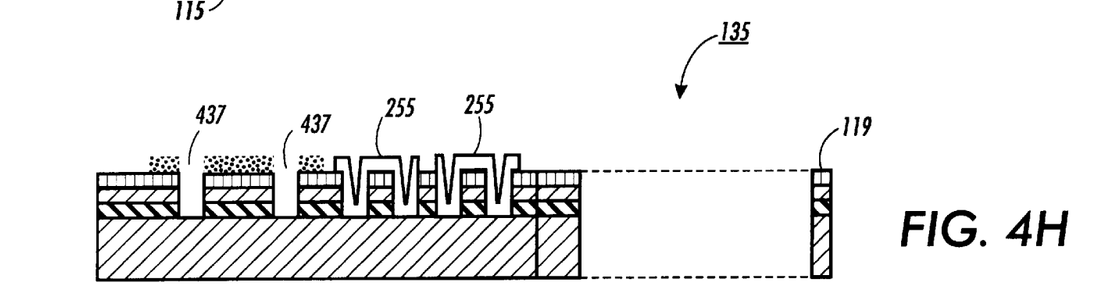

FIG. 4h shows formation of hinges 255 for deflecting mirror 240 from polysilicon layer 117 (not shown, see FIG. 1) that is deposited in this step.

Figure 4I:
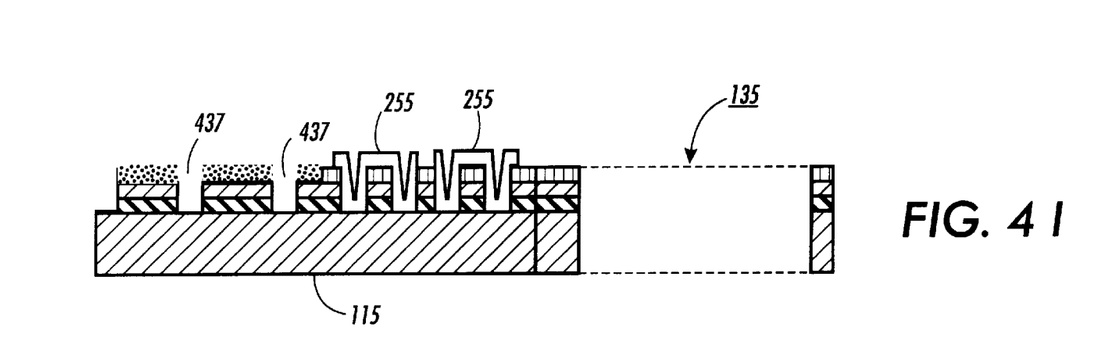

FIG. 4i shows etch of PSG layer 119 and SCS layer 114 to pattern deflecting mirror 240, hinges 255 and access holes 437. A typical size for access holes 437 is 10 μm by 10 μm. Access holes 437 allow for the etchant used to release deflecting mirror 240 to reach insulating layer 116. Deflecting mirror 240 size is typically from 1 mm²–2 mm². Torsional mirror 250 is also defined in this step.

Figure 4J:
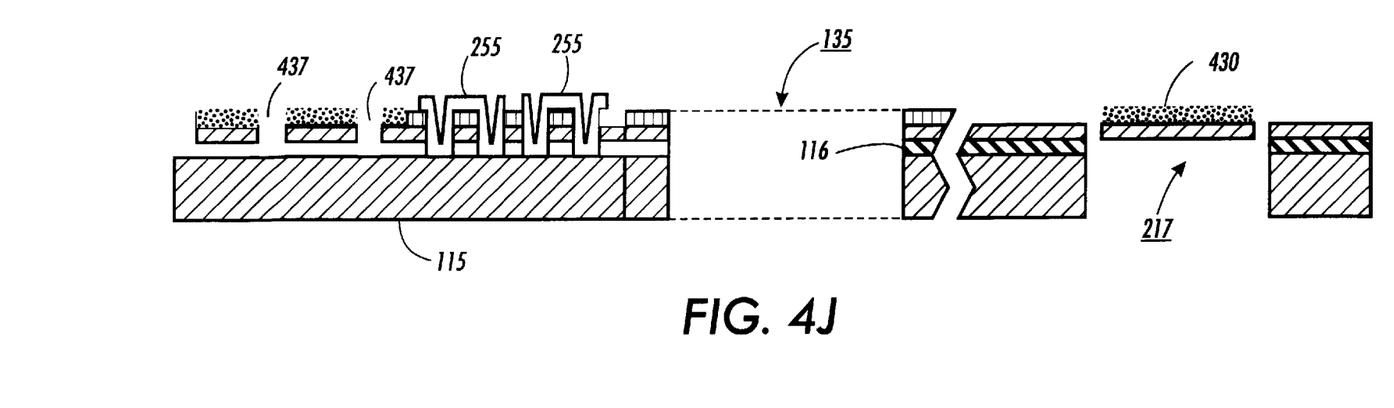

FIG. 4j shows release of deflecting mirror 240, torsional mirror 250 and hinge 255 by etching PSG layer 119 and layer 116 using an HF based etch.

FIGS. 5 a–e show the steps used to fabricate wafer 103 containing VCSEL 105 and mirror actuation electrodes 220 in accordance with an embodiment of this invention.

Figure 5A:
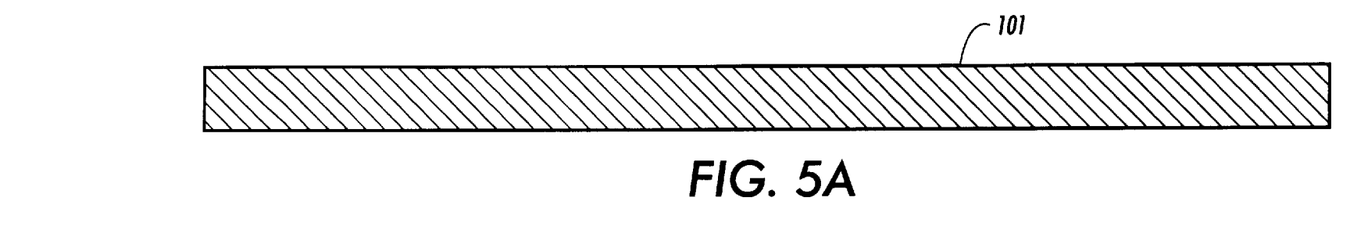
FIGS. 5a–5e show steps for fabricating substrate containing laser die and mirror actuation electrodes in accordance with an embodiment of this invention

FIG. 5a shows starting glass or silicon substrate 101 for fabrication of wafer 103.

Figure 5B:
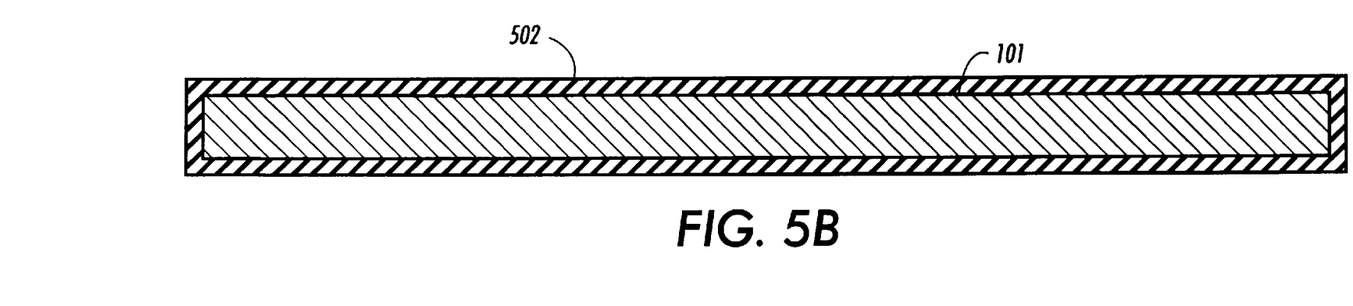

FIG. 5b shows deposition of silicon nitride or silicon dioxide layer 502 by LPCVD or plasma-enhanced CVD process to provide electrical isolation from silicon substrate 101.

Figures 5C, 5D:
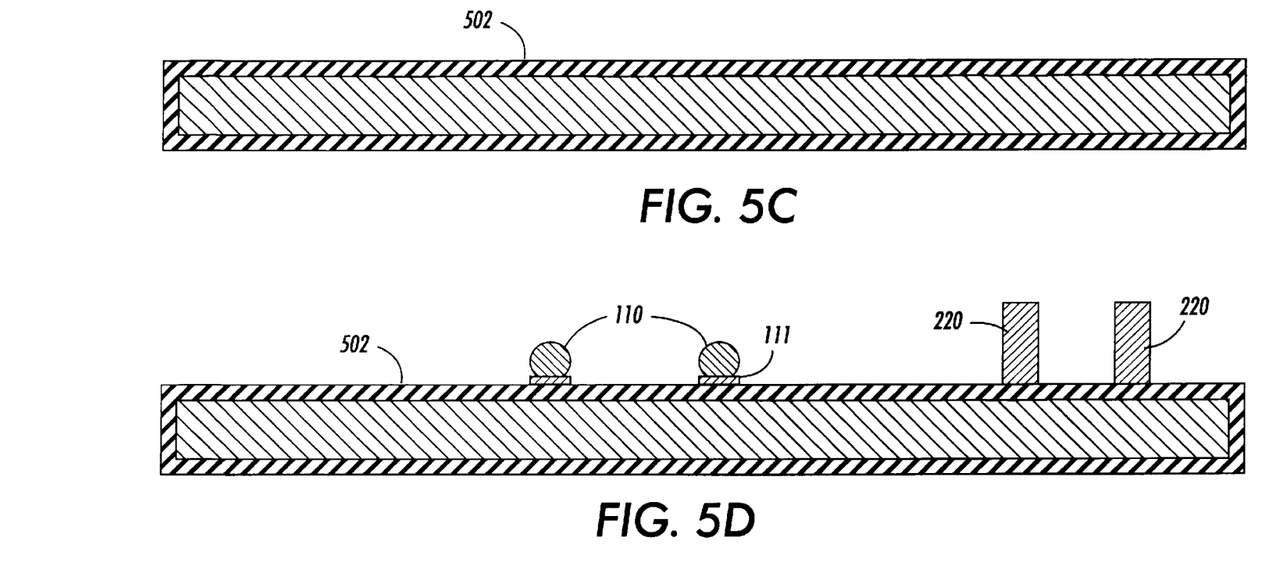

FIG. 5c shows deposition of electrodes 220 and solder for solder bumps 110.

FIG. 5d shows completed deposition of electrodes 220 for mirror actuation. Electrodes 220 are much thicker (~200–300 μm) than solder bumps 110 (typically 50–100 μm) and are electroplated.

Figure 5E:
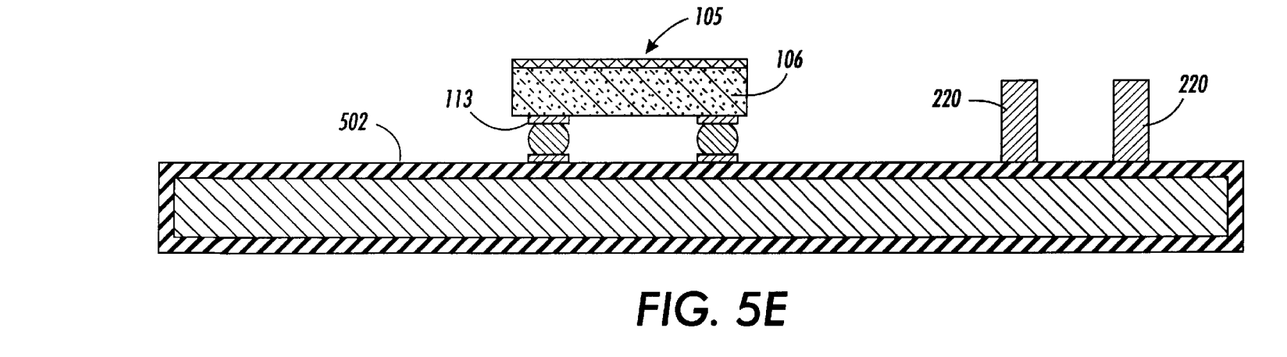

FIG. 5e shows alignment and solder bump bonding of VCSEL 105 to Si substrate 101 in the GaAs bonding step. Solder bumps 110 can be defined on metal bonding pads 113 of VCSEL substrate 106. Si substrate 101 and VCSEL substrate 106 are heated to allow solder to flow and contact wettable metal bonding pads 111 on Si substrate 101.

Figure 6A:
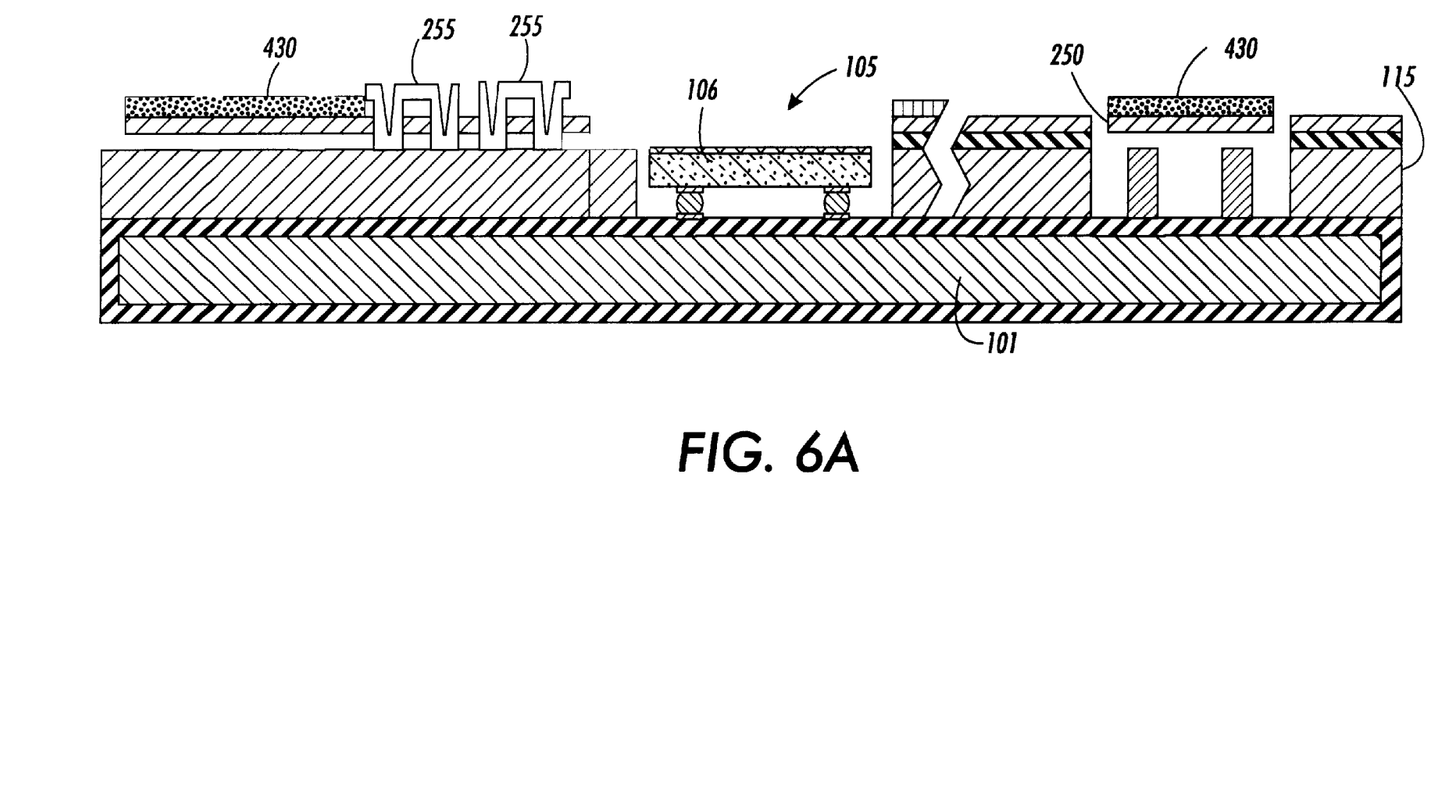
FIG. 6a shows a completed laser beam scanner before release of deflecting mirror in accordance with an embodiment of this invention.
Figure 6B:
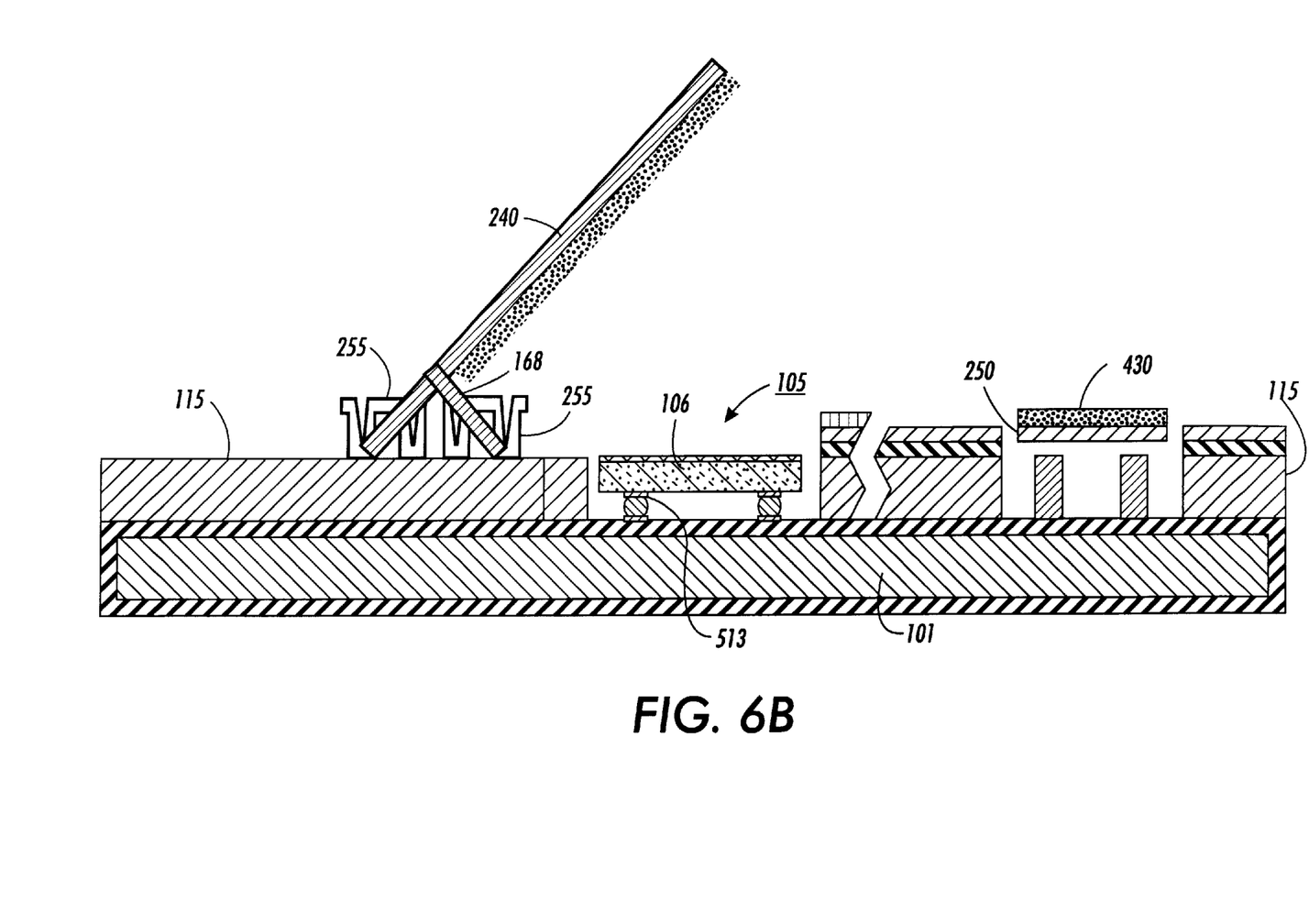
FIG. 6b shows a completed integrated solid state scanner after release of deflecting mirror in accordance with an embodiment of this invention.

FIG. 6a shows integration of substrate 101 with MEMS substrate 130 using well-known procedures of adhesive bonding while FIG. 6b shows the finished assembly with raised deflecting mirror 240 locked into place with latch 168.

Linear arrays of lasers can be bonded in a similar way; the extent of the array being perpendicular to the cross section shown in FIG. 6a.

While the invention has been described in conjunction with specific embodiments, it is evident to those skilled in the art that many alternatives, modifications, and variations will be apparent in light of the foregoing description. Accordingly, the invention is intended to embrace all such alternatives, modifications, and variations that fall within the spirit and scope of the appended claims.

What is claimed is:

1. An integrated laser beam scanning structure comprising:
    a first wafer having a first surface and a second surface, said wafer having a recess piercing said first surface and said second surface;
    a layer having a first region and a second region, said layer being attached to said first surface;
    a deflecting mirror fashioned from said first region of said layer;
    a torsional mirror fashioned from said second region of said layer;
    a second wafer having a first side; and
    a light source mounted on said first side of said second wafer, said first side of said second wafer being attached to said second surface of said first wafer such that said light source occupies said recess
    whereby a light beam emitted from said light source is deflected by said deflecting mirror onto said torsional mirror.

2. The structure of claim 1 wherein said first wafer is a silicon on oxide wafer.

3. The structure of claim 1 wherein said layer is a single crystal silicon layer.

4. The structure of claim 1 wherein said light source is a semiconductor light emitter.

5. The structure of claim 4 wherein said semiconductor light emitter is mounted on said first side of said second wafer using solder bumps.

6. The structure of claim 4 wherein said semiconductor light emitter is a VCSEL chip.

7. The structure of claim 1 wherein said recess is deep reactive ion etched.

8. The structure of claim 1 wherein said torsional mirror is actuated by a pair of electrodes.

9. The structure of claim 1 wherein said torsional mirror is actuated by a thin film coil.

10. The structure of claim 1 wherein a ferromagnetic thin film coil is attached to said torsional mirror.

11. The structure of claim 1 wherein a thin film coil is attached to said torsional mirror.

12. A method for making an integrated laser beam scanner comprising the steps of:

provinding a first wafer having a first surface and a second surface, said wafer having a recess piercing said first surface and said second surface;

attaching a layer having a first region and a second region to said first surface of said first wafer;

fashioning a deflecting mirror from said first region of said layer;

fashioning a torsional mirror from said second region of said layer;

providing a second wafer having a first side, said second wafer having a light source mounted on said first side; and attaching said first side of said second wafer to said second surface of said first wafer such that said light source occupies said recess whereby a light beam emitted from said light source is deflected by said deflecting mirror onto said torsional mirror.

13. The method of claim 12 wherein said layer is a single crystalline silicon layer.

14. The method of claim 12 wherein said light source is a semiconductor light emitter.

15. The method of claim 14 wherein said semiconductor light emitter is a VCSEL chip.

16. The method of claim 14 wherein said semiconductor light emitter is mounted using solder bumps.

17. The method of claim 12 wherein said torsional mirror is actuated by a pair of electrodes.

18. The method of claim 12 wherein said torsional mirror is actuated by a thin film coil and an external magnetic field.

19. The method of claim 12 wherein a ferromagnetic thin film coil is attached to said torsional mirror.

20. The method of claim 12 wherein a thin film coil is attached to said torsional mirror.

* * * * *